US007557705B2

(12) United States Patent
Oas

(10) Patent No.: US 7,557,705 B2
(45) Date of Patent: Jul. 7, 2009

(54) LUGGAGE TAG WITH AN ELECTRONIC CIRCUIT MOTION DETECTOR WHICH WILL SET OFF BLINKING LIGHTS FOR A PERIOD OF TIME AFTER THE MOTION HAS OCCURRED

(75) Inventor: Daniel Oas, Irwindale, CA (US)

(73) Assignee: Calibre International, LLC, Irwindale, CA (US)

( * ) Notice: Subject to any disclaimer, the term of this patent is extended or adjusted under 35 U.S.C. 154(b) by 262 days.

(21) Appl. No.: 11/581,878

(22) Filed: Oct. 17, 2006

(65) Prior Publication Data

US 2008/0088445 A1 Apr. 17, 2008

(51) Int. Cl.
*G08B 13/14* (2006.01)
*G06K 5/00* (2006.01)

(52) U.S. Cl. ................ 340/568.1; 340/571; 340/686.1; 235/382

(58) Field of Classification Search ... 340/568.1–573.7, 340/539.32, 691.5, 695.3, 518.45, 825.36, 340/571, 686.1; 40/124.01; 235/382
See application file for complete search history.

(56) References Cited

U.S. PATENT DOCUMENTS

| | | | | |
|---|---|---|---|---|
| 5,126,719 | A * | 6/1992 | DeSorbo | 340/571 |
| 5,440,290 | A * | 8/1995 | McCullough et al. | 340/552 |
| 5,721,532 | A * | 2/1998 | Lehmann et al. | 340/571 |
| 5,833,235 | A * | 11/1998 | Lesley et al. | 273/119 R |
| 5,861,808 | A * | 1/1999 | Lehmann et al. | 340/571 |
| 6,147,602 | A * | 11/2000 | Bender | 340/568.1 |
| 6,166,635 | A * | 12/2000 | Huang | 340/571 |
| 6,229,445 | B1 | 5/2001 | Wack | |
| 6,304,183 | B1 * | 10/2001 | Causey | 340/572.1 |
| 6,462,658 | B1 * | 10/2002 | Bender | 340/568.1 |
| 6,522,253 | B1 * | 2/2003 | Saltus | 340/571 |
| 6,624,752 | B2 | 9/2003 | Klitsgaard et al. | |
| 6,975,221 | B2 | 12/2005 | Monck | |
| 2003/0067397 | A1 | 4/2003 | Trimble | |
| 2004/0075554 | A1 | 4/2004 | Yang | |
| 2004/0130447 | A1 * | 7/2004 | Monck | 340/539.32 |
| 2004/0252030 | A1 | 12/2004 | Trimble | |
| 2005/0040229 | A1 * | 2/2005 | Andrews et al. | 235/382 |
| 2006/0045677 | A1 | 3/2006 | Garfield et al. | |
| 2006/0077058 | A1 | 4/2006 | Asher | |

FOREIGN PATENT DOCUMENTS

| | | |
|---|---|---|
| JP | 2004317820 | 11/2004 |
| WO | WO 99/367978 | 7/1999 |

* cited by examiner

*Primary Examiner*—Benjamin C Lee
*Assistant Examiner*—Sigmund Tang
(74) *Attorney, Agent, or Firm*—Thomas I. Rozsa

(57) ABSTRACT

The present invention is directed to an electronic luggage tag. The luggage tag includes an electronic circuit connected to a motion detector and also connected to a source of power such as at least one DC battery. The luggage tag also includes at least one and preferably a multiplicity of illumination means such as LEDs. In its at rest condition, the electronic circuit is in a sleep mode so that only minimal power from the battery is consumed. When the tag is jostled, the motion detector activates the electronic circuit to cause the battery to generate power to the circuit which in turn causes the LEDs to blink on and off for a period of time so that the luggage tag can be located. The luggage tag is in turn attached to a piece of luggage. The luggage tag can also retain an information card.

12 Claims, 8 Drawing Sheets

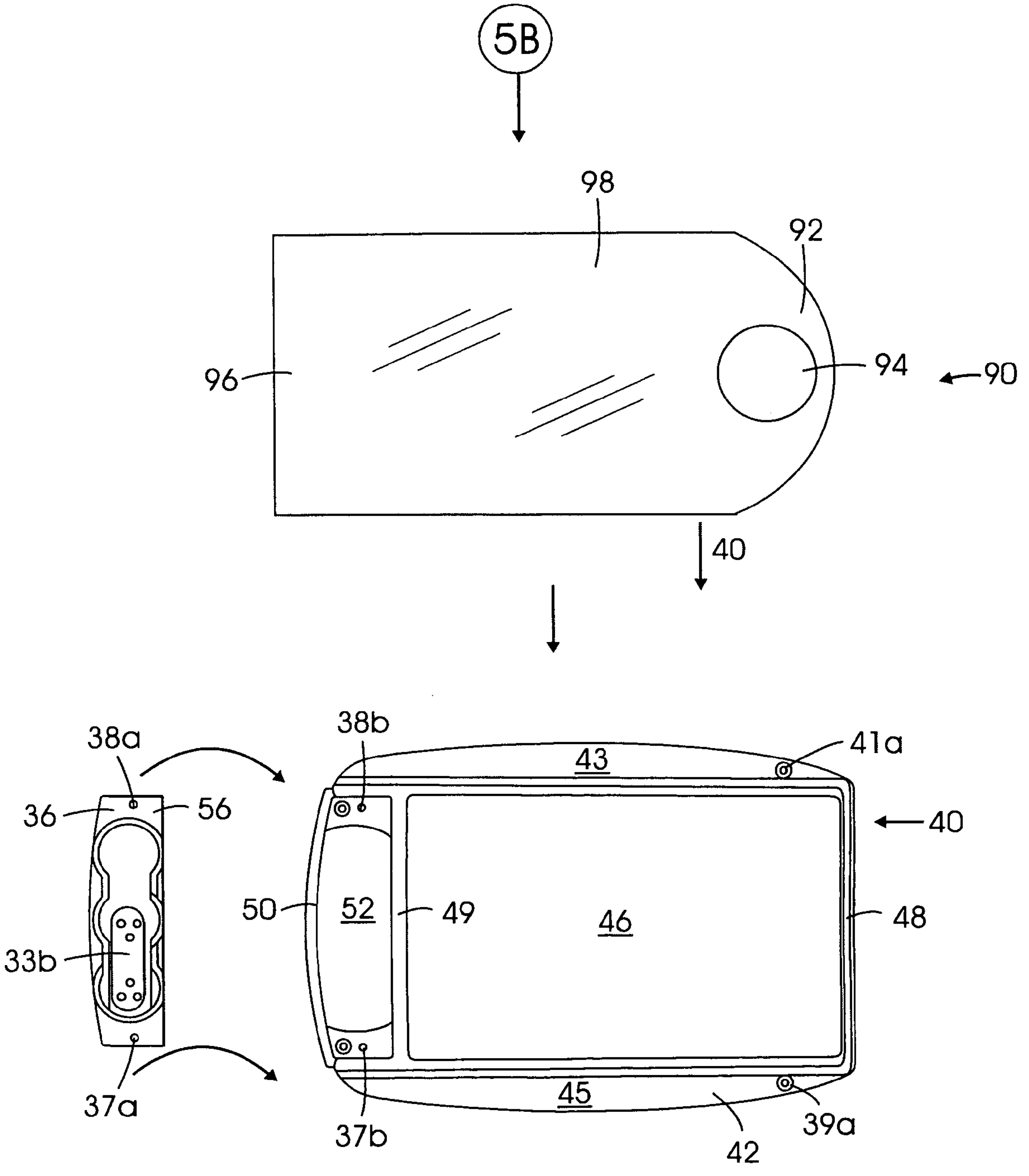
FIG. 5B
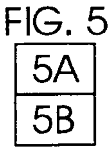

LUGGAGE TAG WITH AN ELECTRONIC CIRCUIT MOTION DETECTOR WHICH WILL SET OFF BLINKING LIGHTS FOR A PERIOD OF TIME AFTER THE MOTION HAS OCCURRED

BACKGROUND OF THE INVENTION

1. Field of the Invention

The present invention is related to the field of luggage tags.

2. Description of the Prior Art

In general, various innovations in luggage tags are known in the prior art. The following 13 patents and published patent applications are the closest prior art references which are related to the present invention.

1. U.S. Pat. No. 5,126,719 issued to John DeSorbo on Jun. 30, 1992 for "Remotely Armed Alarm System" (hereafter the "DeSorbo Patent");

2. U.S. Pat. No. 6,147,602 issued to Sheldon Bender on Nov. 14, 2000 for "Luggage Locator System" (hereafter the "Bender Patent");

3. U.S. Pat. No. 6,229,445 issued to C. Jay Wack and assigned to TecSec, Incorporated on May 8, 2001 for "RF Identification Process And Apparatus" (hereafter the "Wack Patent");

4. U. S. Published Patent Application No. 2003/0067397 issued to Bradley G. Trimble on Apr. 10, 2003 for "Object Locating System Employing RF Signaling" (hereafter the "7397 Trimble Published Patent Application");

5. U.S. Pat. No. 6,624,752 issued to Niels Christian Klitsgaard et al. and assigned to Bluetags, A/S on Sep. 23, 2003 for "Object Detection System" (hereafter the "Klitsgaard Patent");

6. U. S. Published Patent Application No. 2004/0075554 issued to Roger Yang on Apr. 22, 2004 for "Luggage Location And Identification System" (hereafter the "Yang Published Patent Application");

7. U. S. Published Patent Application No. 2004/0252030 issued to Bradly G. Trimble et al. on Dec. 16, 2004 for "Object Loading System Including Addressable Remote Tags" (hereafter the "2030 Trimble Published Patent Application");

8. U.S. Pat. No. 6,975,221 issued to Joan M. Monck on Dec. 13, 2005 for "Luggage Identifier for Air And Rail Travelers" (hereafter the "Monck Patent");

9. U. S. Published Patent Application No. 2006/0045677 issued to Steven M. Garfield et al. on Mar. 2, 2006 for "Loading And Unloading Device" (hereafter the "Garfield Published Patent Application");

10. U. S. Published Patent Application No. 2006/0077058 issued to Del Asher on Apr. 13, 2006 for "Luggage Locator" (hereafter the "Asher Published Patent Application");

11. International Patent Application No. WO 99/367978 issued to Jay C. Wack and assigned to Tecsec, Incorporated on Jul. 22, 1999 for "RF Identification Process And Apparatus" (hereafter the "Wack International Patent Application");

12. Patent Abstract of Japan No. JP2004317820 issued to Kosuda Kazuhiko et al. and assigned to Microstone Corp. (hereafter the "Kazuhiko Patent Abstract of Japan").

The DeSorbo Patent is a remotely armed alarm system which is designed to send off an alarm if someone's personal article such as a briefcase is removed. The remote alarm includes a motion-activated receiver alarm disposed in the article. The receiver alarm is armed in response to a first RF signal from a remote transmitter/controller and is disarmed in response to a second RF signal transmitter. The receiver/alarm produces an audible sound when the article is moved. Therefore, this apparatus is designed to set off alarm if someone has stolen someone's briefcase, purse, etc.

The Bender Patent discloses a luggage locator system. The object locator system includes a transmitter unit which sends an RF signal upon actuating a push button and receiver unit attached to or incorporated into an object for detecting the RF signal and illuminating a light element only for so long as the RF signal is sent by the transmitter unit. In this innovation, the device is attached to luggage and when the push button is activated, it sends a signal which is received by the device which in turn illuminates through a source of illumination element 20 to provide a visual indication of where the luggage is.

The Wack Patent has a combination of having a visual indicator which is placed on an airline ticket and also attached to the person's luggage so that in the event the person leaves the luggage and does not board the airplane, a signal is sent so that the luggage can be found as it is matched to the ticket, which is described in Column 3 Line 54 through Column 4 line 7.

The 7397 Trimble Published Patent Application was published in 2003 and has not yet issued. Referring to FIG. 16, one of the embodiments of the object identifying and locating system is used as an electronic luggage tag identifier and located for identifying baggage. This once again includes an RF transmitter transmitting a signal which sets off the indicator on the luggage tag.

The Klitsgaard Patent is an object detection system. The tag is adaptable for attachment to luggage and is adapted for transmission of an identifiable signal and a receiver for detecting and identifying the signal. The invention is concerned with the use of an internet and handheld terminal such as mobile phones in combination with Blue Tooth or DECT technology for communicating information in relation to the object. "FIG. 7 shows a luggage conveyer 23 and three pieces of luggage 24, 25 and 26 . The suitcase 26 is provided with a handle 27 with an integrated luggage tag 28. The terminal 18 is similar to the terminal of FIG. 6. As the suitcase 26 is advanced on the conveyer the luggage tag is activated by the movement of the conveyer or by the illumination of the room or the luggage tag is activated by the presence of Blue Tooth signals in the area."

The Yang Published Patent Application is again published and is not yet an issued patent. This once again discloses a device that requires an electronic signaling transmitter and receiver. Upon activation and receipt of the signal a sound is emitted from the luggage.

The 2030 Trimble Published Patent Application is once again not yet an issued patent. It is similar to the previously described Trimble Application, but has also additional features and embodiments. An electronic tag with luggage locator tag 101 is activated by a transmitter unit 106 to uniquely identify packages or bags such as a piece of luggage 100. Once again it is sending out a response after receiving an RF signal.

The Monck Patent is a luggage identifier for air and rail travelers. Referring to FIG. 3, identification means for the luggage tag are provided on a bag in addition to a flexible flag pool which comprises (I) a strip of light bulbs or LED lights in the luggage cording 18; (II) a sewn in panel housing lights 19; and (III) a privacy panel 20 removably affixed to the sewn in panel by hook and loop fasteners. A battery pack 9 provides power to the strip of light bulbs or LEDs. Again it is activated by radio transmitted signal which is received by receiving an activating unit 12.

The Garfield Published Patent Application was published in March 2006. Referring to item 78, the patent application states "optionally a bag locator 296 being an LED and/or audible device is/are built into the handle 202 or otherwise located on the rail lift suitcase 200. The locator can be activated by pressing the extra button 178 on the wireless remote control 176. When activated, the locator 296 will flash a light and/or make a sound that will help to distinguish the user's bag from the others."

The Asher Published Patent Application is an improved luggage locator of a remote member and replacement luggage tag member. The remote member activates the luggage tag member by transmission of some electromagnetic signal. The luggage tag member is configured to attach a standard luggage member and reversibly receives and illuminates and the like.

The International Wack Patent is similar to the previously discusses Wack Patent and again deals with an RF identification system which requires transmitting a signal in order to activate the luggage tag.

Finally, the Kazuhiko Japanese Patent Abstract deals with a name tag. This basically is a method of illuminating a luggage tag so that it can be seen in a dark place.

There is a significant need to have an electronic luggage tag which can self activate for emitting blinking lights to significantly improve the ease for a person to locate his luggage, in addition to containing an information card for luggage identification.

SUMMARY OF THE INVENTION

The present invention is directed to an electronic luggage tag. The luggage tag includes an electronic circuit connected to a motion detector and also connected to a source of power such as at least one DC battery. The luggage tag also includes at least one and preferably a multiplicity of illumination means such as LEDs. In its at rest condition, the electronic circuit is in a sleep mode so that only minimal power from the battery is consumed. When the tag is jostled, the motion detector activates the electronic circuit to cause the battery to generate power to the circuit which in turn causes the LEDs to blink on and off for a period of time so that the luggage tag can be located. The luggage tag is in turn attached to a piece of luggage. The luggage tag can also retain an information card.

It has been discovered, according to the present invention, that if a luggage tag contains DC powered electronic devices including a motion detector electronically connected thereto and a plurality of LEDs electronically connected to the source of power with the LEDs placed on opposite outer sides of the luggage tag, then if the luggage tag is jostled, it will cause the motion detector to activate the electronics and cause the LEDs to be powered and blink on and off for a period of time so that the luggage tag which is attached to a piece of luggage enables the luggage to be easily located.

It has further been discovered, according to the present invention, that if the electronic circuit is in a standby mode when not in use, then the power drain on the source of power such as a DC battery is minimal and the electronics can last a long time before the battery needs to be replaced.

It has further been discovered, according to the present invention, that if a luggage tag retains an information card which is protected with a transparent plastic sheet, wherein the information card contains contact information including a name, address, and telephone number of the luggage holder, then the luggage to which the luggage tag is attached can be more easily returned to the owner if the luggage is lost.

It is therefore an object of the present invention to provide a luggage tag which contains a DC powered electronic devices including a motion detector placed inside, and a plurality of LEDs placed on opposite outer sides of the luggage tag, so that the LEDs will blink a short period of time for a person easily to find a luggage after the tag which is attached to the luggage is jostled due to a jostling the luggage, wherein the jostling of the tag causes the motion detector to output signals, which triggers the electronics to output a sequential power to drive the LEDs for emitting blinking lights.

It is also an object of the present invention to provide a luggage tag which retains an information card covered with a transparent plastic sheet, so that it is easy for a luggage owner to find the luggage, wherein the information card contains contact information including a name, address, and telephone number of the luggage holder.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 5B is a perspective exploded view to show the structural features of the bottom information card frame with the battery compartment cover, and a transparent plastic sheet used to cover the information card for protection.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is an electronic luggage tag to enable a person to easily find their luggage when it is located among numerous other pieces of luggage at a location such as the luggage retrieval conveyor belt in an airport terminal. The present invention luggage tag contains a motion sensor which is set off by the jostling of the piece of luggage to which the tag is attached when the luggage comes down a chute and onto the luggage retrieval conveyor belt. The motion detector generates a signal to activate a built in DC powered electronic circuit which causes an output of power for a period of time to drive multiplicity of LEDs which emit a blinking light for a period of time. The luggage tag also retains an information card having information including a name, telephone number, and an address of the luggage owner for identification of the piece of luggage.

Figure 1:
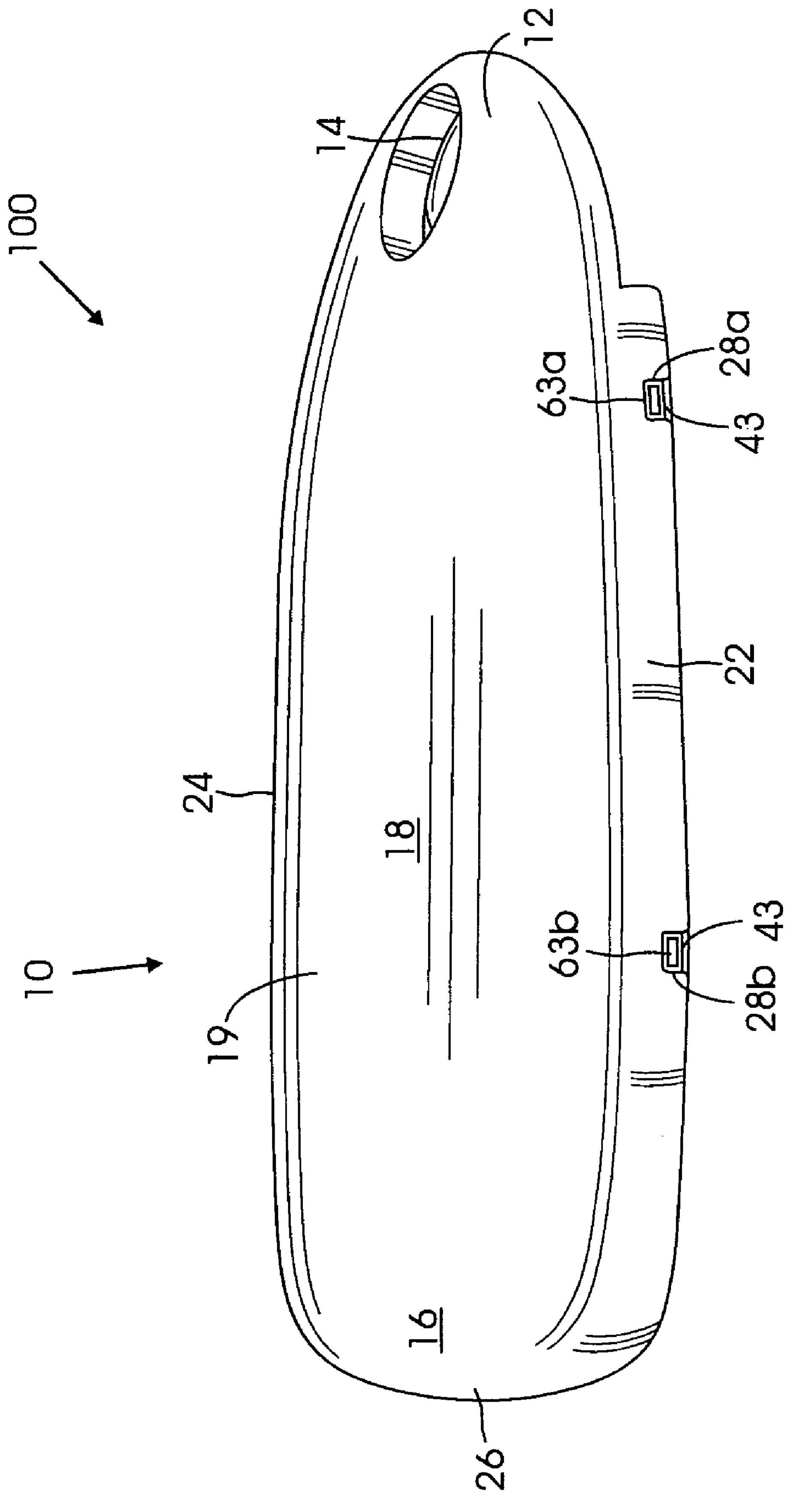
FIG. 1 is a top perspective view of the present invention electronic luggage tag containing an electronic motion detector.
Figure 2:
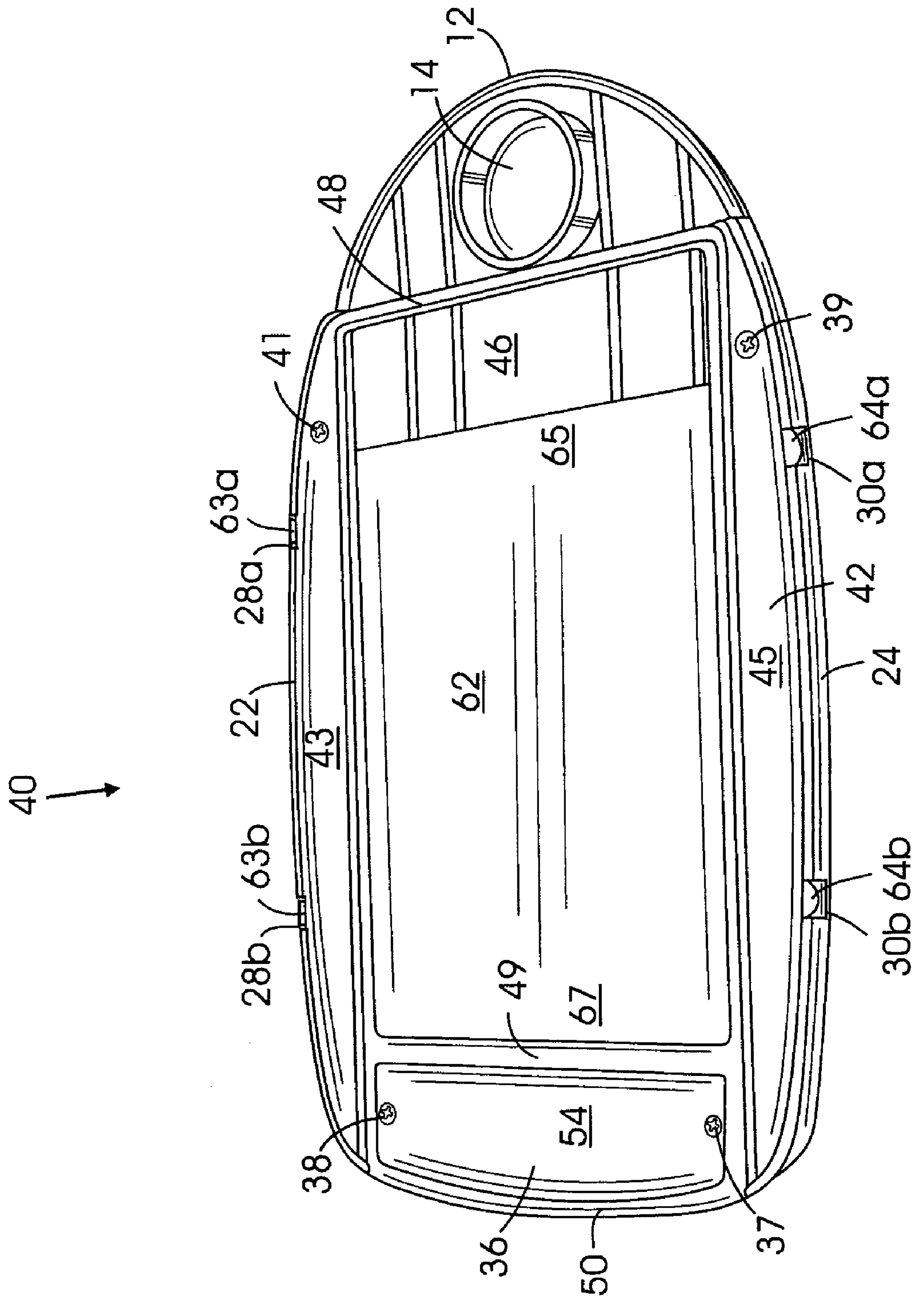
FIG. 2 is a rear perspective view of the present invention electronic luggage tag containing an electronic circuit motion detector, wherein it also contains an information card compartment for installation of the information card.

Referring to the perspective top and rear views of FIGS. 1 and 2, there is illustrated one preferred embodiment of the present invention electronic luggage tag 100 which comprises outer components including a top cover 10 as a top outer side surface 18 and a rear information card frame 40 which serves as the rear side of the luggage tag. The top cover 10 of the luggage tag is illustrated as a piece of plastic with an outer top surface 18 with a proximal round end 12 of the top surface which extends to a generally rectangular section 19 which terminates in a distal flat bottom end 16 with rounded corners. Adjacent to the round proximal end 12 is a transverse 14 extending through the entire thickness of the top cover 10. The top cover 10 is further comprises a first elongated side wall 22 and a second elongated sidewall 24 which is generally parallel to the first elongated sidewall 22. A transverse distal end wall 26 extends between the elongated sidewalls 22 and 24 at the distal flat bottom end 16.

In the preferred embodiment of the present invention shown in FIGS. 1 and 2, there is illustrated two openings 28*a* and 28*b* located on the first sidewall 22 of the top cover 10, wherein the opening 28*a* is closer to the proximal round front end 12, and the opening 28*b* closer to the distal flat bottom end 16. Similarly as illustrated in FIG. 2, another two openings 30*a* and 30*b* are located on the second side wall 24, wherein the opening 30*a* is closer to the proximal round front end 12 and the other opening 30*b* closer to the distal flat bottom end 16. The openings are use to install LED lights which are connected to an electronic circuit board, wherein the electronic circuit board is installed inside of the luggage tag 100. As illustrated in FIGS. 1 and 2, the LED 63*a* and 63*b* are installed into the respective openings 28*a* and 28*b* on the first side all 22, and the LED 64*a* and 64*b* are installed into the respective openings 30*a* and 30*b* on the second sidewall 24 of the top cover 10.

Referring to FIG. 2, the rear information card frame 40 which is also a piece of plastics has a generally rectangular shape. It comprises a proximal strip bar 48 at its proximal end, a distal curved bar 50 at its distal end which matches the bottom end 16 of the top cover, a first and second side flat elongated area 43 and 45 which match the 1 respective vertical first sidewall 22 and the vertical second sidewall 24 of the top cover 10. The proximal strip bar 48, the distal curved end bar 50, and the first and second side flat areas 43 and 45 comprise the frame which contains a rectangular opening 46 for use as a window for displaying an information card. Referring further in FIG. 2, there is illustrated a battery compartment cover 36 having a generally rectangular shape, which is located adjacent to the distal curved end bar 50, wherein the battery cover 36 is affixed by two screws at its two respective ends, one 38 is close to the first side flat area 43, and the other one 37 is close to the second side flat area 45 of the frame 40. In addition, an additional strip bar 49 is shown located transverse to the first and second side flat areas 43 and 45, and located between the battery compartment cover 36 and the rectangular opening 46.

Figure 3:
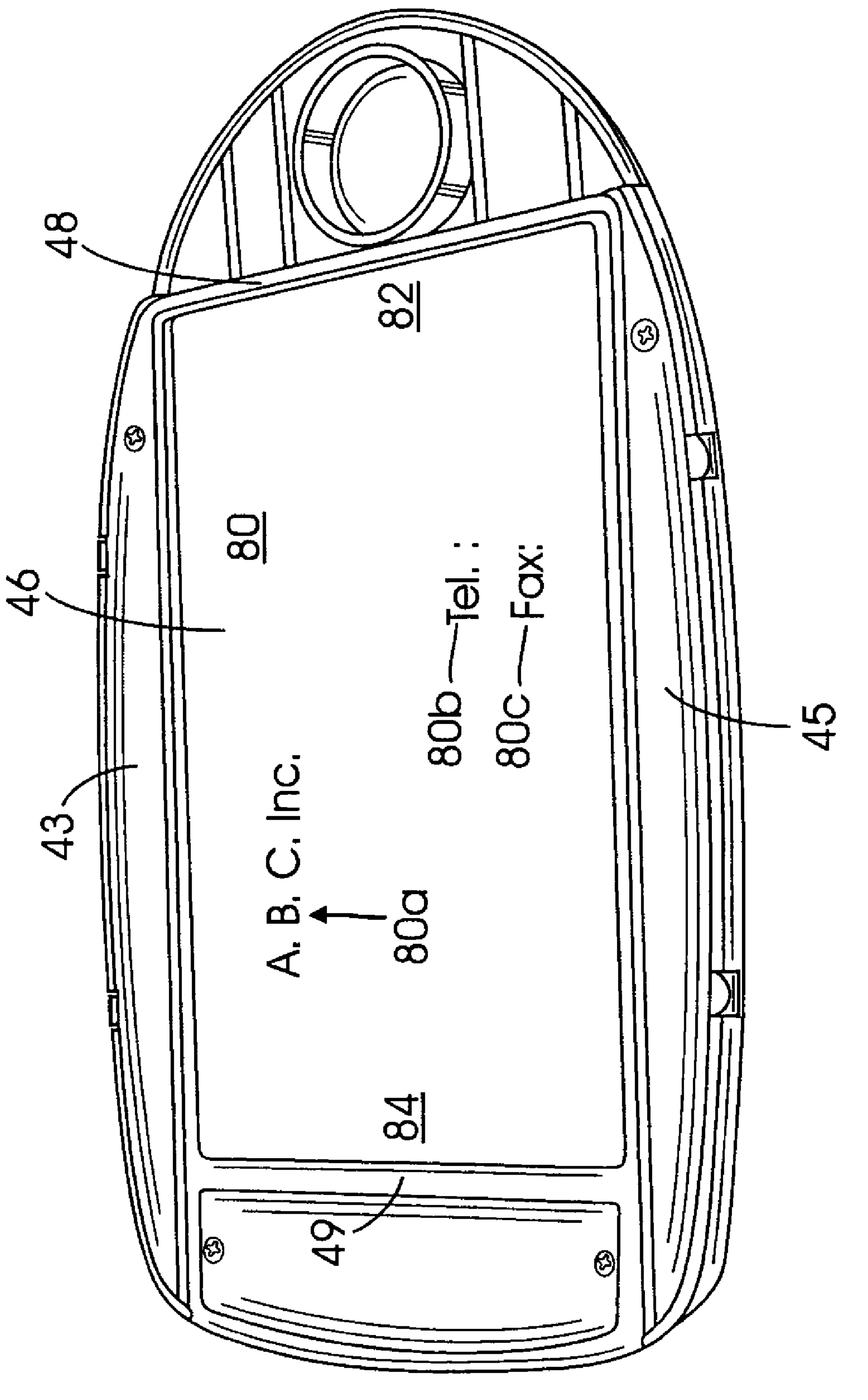
FIG. 3 is a rear perspective view of the present invention electronic luggage tag containing an electronic circuit motion detector, with the information card having a name, telephone and fax number placed into the information card compartment which is located on the rear side of the luggage tag.
Figure 4:
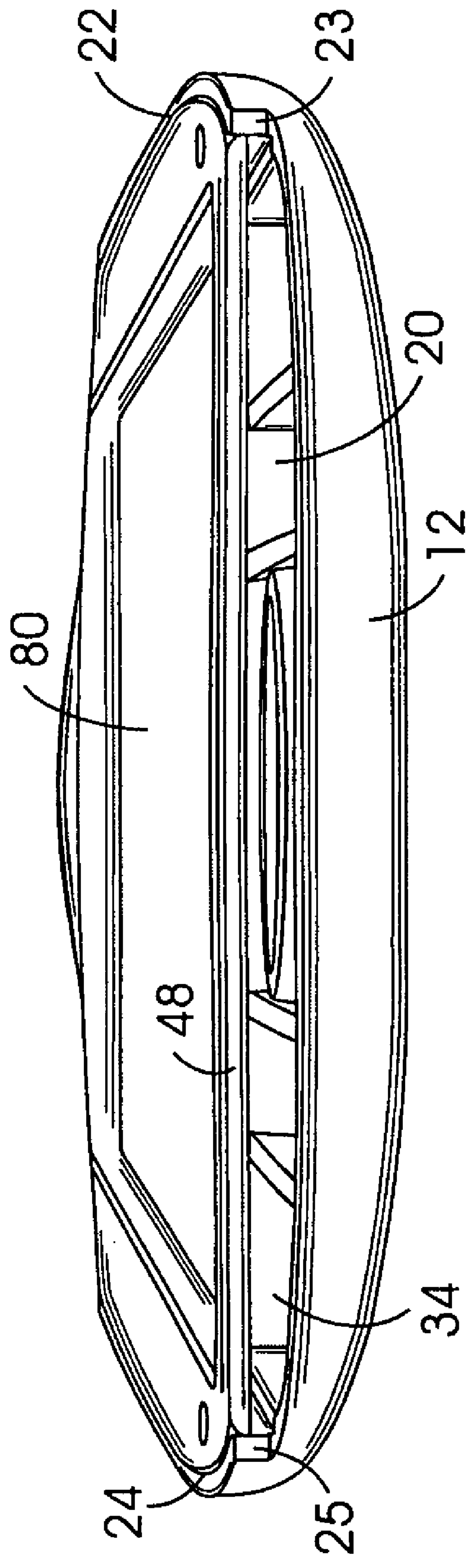
FIG. 4 is a front view of the present invention an electronic luggage tag which shows an entrance of the information card compartment for placing and removing of the card into the compartment.

The present invention electronic luggage tag 100 also physically retains an information card 80 for luggage identification. In FIG. 3 there is illustrated a rectangular information card 80 containing contact information including a name 80*a*, a telephone number 80*b*, and a fax number 80*c* which is placed under the window of the rectangular opening 46 of the rear frame 40, and over a rear side 62 of an electronic circuit board 60, which is shown in FIG. 2. The information card 80 is installed along the elongated rectangular direction so that a proximal end 82 of the card is under the strip bar 48 as the proximal end of the frame, and a distal end 84 of the card is under the strip bar 49 of the frame 40. It will be appreciated that the information card 80 is inserted through an entrance 34 of a flat opening illustrated in FIG. 4, and is further under an inner side of the frame 40 but over the rear side 62 of the electronic circuit board 60. Referring to FIG. 4, the flat opening 34 is constructed from the proximal strip bar 48 of the rear information card frame 40, a proximal end 23 and 25 of the respective first and second sidewall 22 and 24 of the top cover 10, and an inner side 20 of the top cover 10.

One preferred embodiment of the present invention components of the electronic luggage tag 100 are illustrated in FIG. 5 which include the top cover 10, an electronic circuit board 60 placed between the top cover 10 and the rear information card frame 40, and a transparent plastic sheet 90 as a cover to protect the information card 80.

Figure 5A:
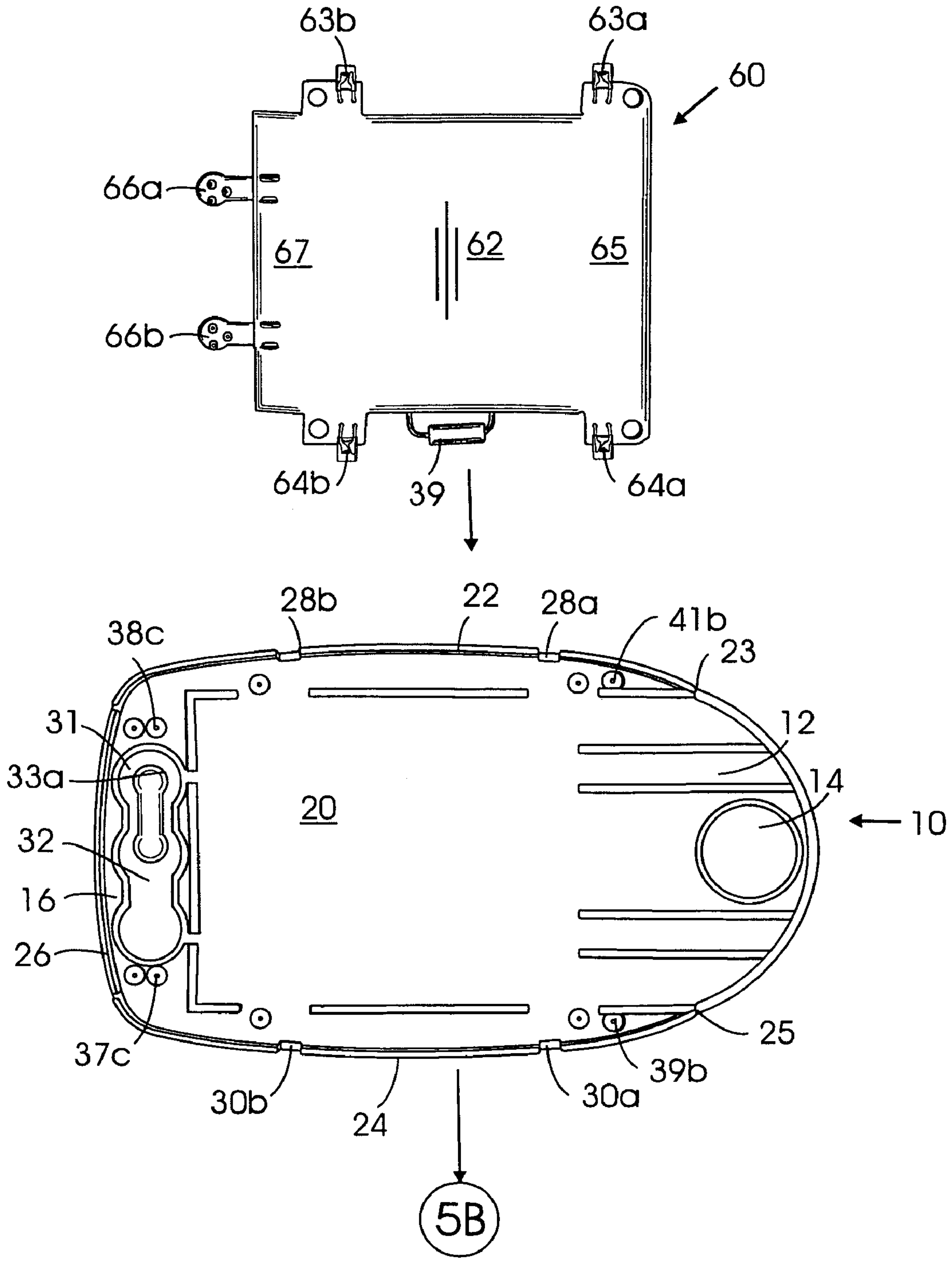
FIG. 5A is a perspective exploded view to show the structural features of the top cover on the inner side and the electronic circuit board on the rear side of the present invention electronic luggage tag.

Although the structural features of the top cover 10 is illustrated in FIG. 1, the structure of the top cover 10 on the inner side 20 is illustrated in the rear side view of FIG. 5A. The top cover 10 on its inner side 20 includes a first group of two female threaded screw holes 41*b* and 39*b*, which are located close to the respective proximal front end 23 and 25 of the first and second sidewalls 22 and 24, a second group of two female threaded screw holes 38*c* and 37*c*, which are located adjacent to the distal sidewall 26 and also close to the respective first and second sidewalls 22 and 24 and a base 32 of a battery compartment, which is surrounded by an enclosed side wall 31. As illustrated, the base 32 of the battery compartment is generally a rectangular shape for placing three disc batteries in series, which is located adjacent and further parallel to the distal sidewall 26 of the top cover, wherein a strip pad 33*a* of an electric connector for contacting two disc batteries is placed inside of the base 32 parallel to the distal side wall 26 and further close to the first sidewall 22 of the top cover.

The electronic circuit board 60 shown in FIG. 5A is a generally square shape having the flat rear side 62 with a first end 65 and second end 67. The board contains a first group of two LED lights, the LED 63*a* and 63*b* located at one side of the board, which are installed into the respective opening 28*a* and 30*a* on the first sidewall 22 of the top cover 10 after the board 60 is assembled into the tag 100. The board 60 also contains a second group of two LED lights, the LED 64*a* and 64*b* located at the opposite side of the board, which are installed into the respective opening 30*a* and 30*b* on the second sidewall 24 of the top cover 10. Two electric contacting pads 66*a* and 66*b* which are placed on the second end 67 of the board 60 link the DC electricity of the batteries to the electronics on the circuit board. The electronic circuit board 60 is installed, as illustrated in FIG. 2, between the top cover 10 and the rear information card frame 40, wherein the second end 67 of the board 60 is close to the base 32 of the battery compartment, and the first end 65 is closed to the two female threaded screw holes 39*b* and 41*b* of the rear frame 40.

The rear information card frame 40 is further illustrated in FIG. 5B to comprise an opening 52 for the battery compartment, which has a room to contain three disc batteries placed in series parallel to the slightly curved flat end 50. A pair of screw holes 38*b* and 37*b* are respectively placed around two ends of the opening 52, which match the respective screw holes 38*a* and 37*a* on the battery compartment cover 36, which is also shown in FIG. 5. The battery compartment cover 36 at its inner side 56 is illustrated to comprise an electric connector 33*b* which is a piece of metal strip pad having a length long enough to contact two disc batteries. The electric connector 33*b* is further placed close to the screw hole 37*a*, which is adjacent to the second side flat elongated area 45 of the frame 40 after installation of the battery compartment cover 36. An additional two screw holes 41*a* and 39*a* are illustrated to be place close to the proximal strip bar 48 on the respective first and second side flat elongated area 43 and 45. Referring to the illustration in FIGS. 2 and 5, it will be appreciated that a pair of screws 39 and 41 can affix the rear information card frame 40 to the top cover 10 by penetrating the respective screw holes 39*a* and 41*a* on the frame 40 to link the respective female threaded screw hole 39*b* and 41*b* on the inner side 20 of the top cover. Similarly, an additional pair of screws 37 and 38 can affix the battery compartment cover 36 onto the rear information card frame 40 and further affix the frame 40 to the top cover 10 by penetrating the respective screw holes 37*a* and 38*a* on the cover 36 and continuing through the respective screw holes 37*b* and 38*b* on the frame 40 to the respective female threaded screw holes 37*c* and 38*c* on the inner side 20 of the top cover 10.

Referring to FIG. 5B, there is illustrated the present invention electronic luggage tag 100 which further comprises a piece of transparent plastic sheet 90 to protect the card 80. The sheet 90 comprises a proximal round front end 92 which extends to a rectangular body with a flat end 96 transverse to the round front end 92. A round opening 94 is located close to the front round end 92. It will be appreciated that the round front end 92, the opening 94, and the flat end 96 of the plastic cover 90 match the respective the proximal round end 12, the opening 14 of the top cover 10, and shape of the information card 80. It will be further appreciated that the transparent plastic sheet 90 can be placed over the information card 80, and then both the sheet and card together can be inserted through the entrance 34 to extend along the rear flat side 62 of the electronic circuit board shown in FIG. 2, and finally be displayed under the window of the opening 46 shown in FIG. 3, wherein the flat end 96 of the plastic sheet 90 is placed under the bar 49 of the frame 40.

Figure 6:
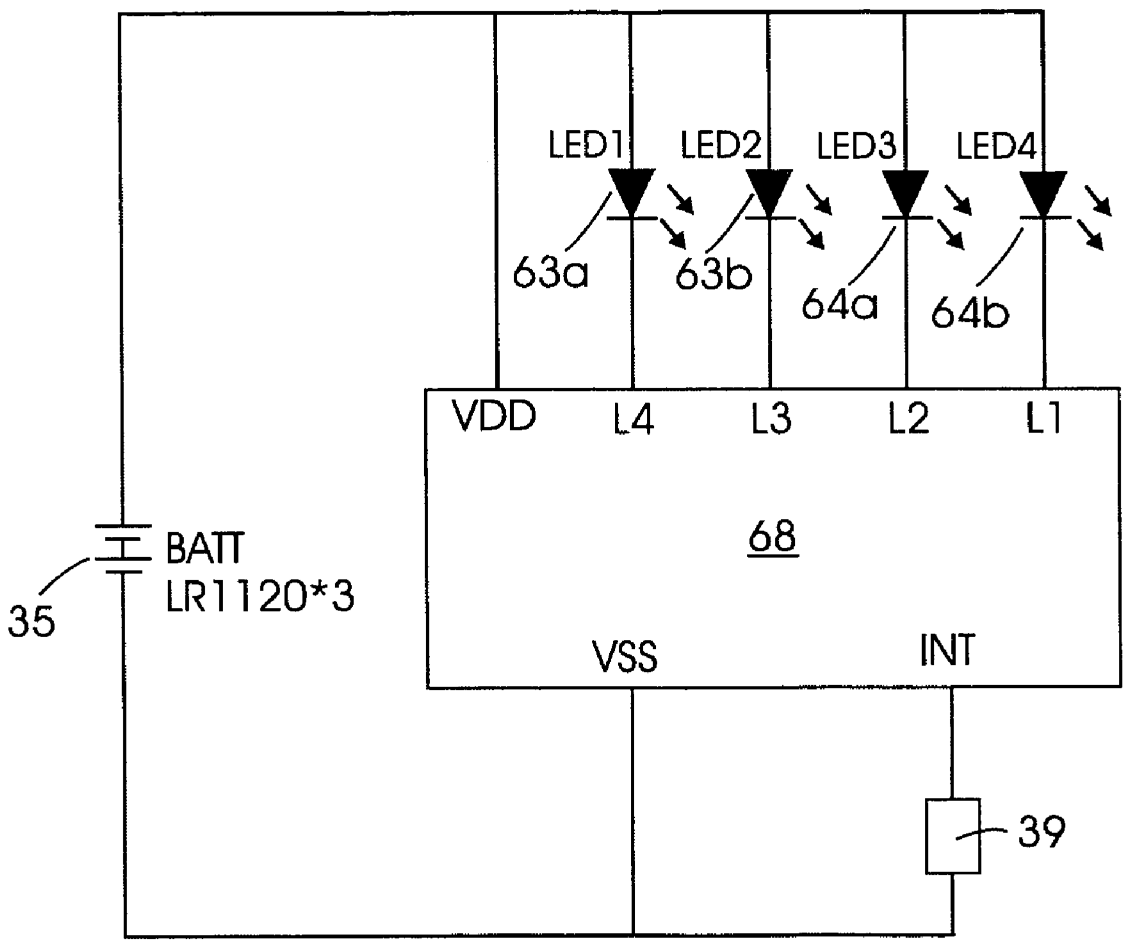
FIG. 6 is a schematic diagram of the electronic circuit which is used in the present invention.
Figure 7:
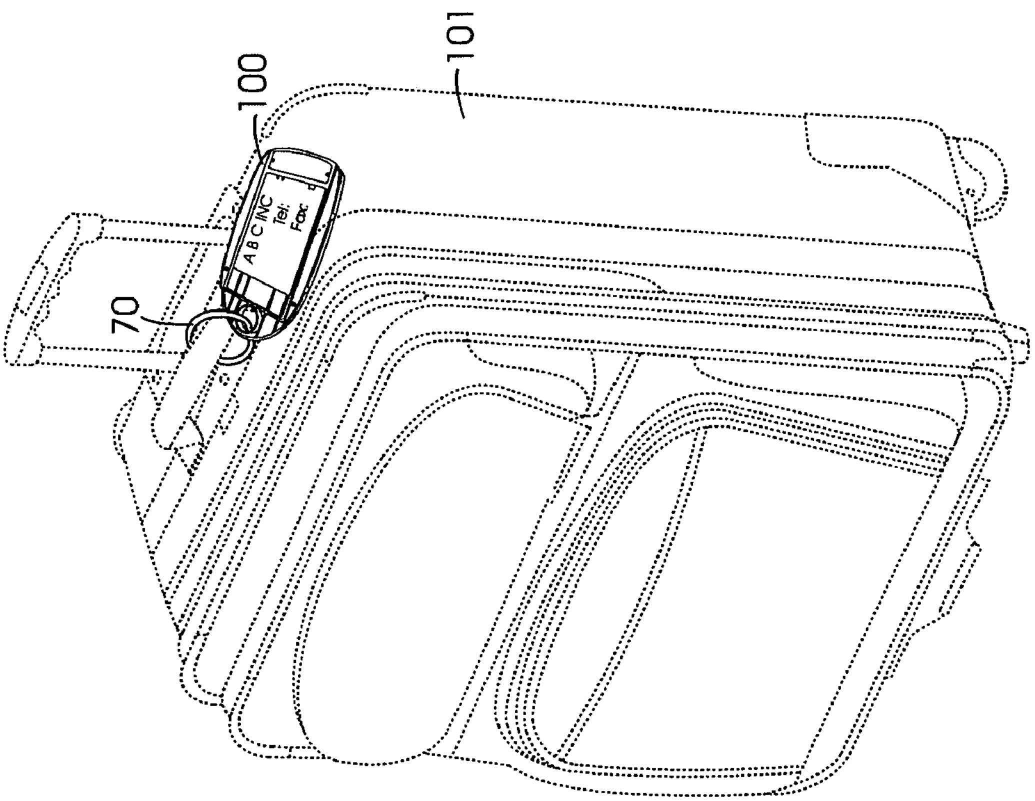
FIG. 7 is a perspective view to illustrate one alternative location where the present invention luggage tag can be attached onto a piece of luggage.

The present invention luggage tag is also an electronic device, containing various electronic components, which are shown from a schematic circuit diagram of FIG. 6. The electronic luggage tag comprises a D.C. power source 35 having three disc batteries in series, which are connected through the strip bars of the electric connectors 33*a* and 33*b*, and further through the electric connectors 66*a* and 66*b* to the electronics on the electronic circuit board 60.

As illustrated in FIG. 6, all electronic components of the luggage tag 100 are electrically powered but they are not activated and are in a standby state, which only consumes a finite standby current. Therefore, the DC power source of the disc batteries can sustain the standby power consumption for years. The electronics can be activated which makes the present invention electronic luggage tag work in accordance with a mechanism that detects a physical motion of the tag, such as a jostling of the tag which is detected by the motion detector. The detector 39 then exports electrical signals to trigger the integrated electronic circuit 68, therefore, the powered electronics is then activated to further output a sequential power in a short period of time to the LEDs for emitting blinking lights, based on preprogramed lighting time instruction stored inside of the electronic circuit 68, for example, lighting about 15-20 seconds before the electronics turns back to the standby state.

The above designed working mechanism of the luggage tag 100 can be executed from a luggage 200 in travel as that shown in FIG. 8, which is attached the present invention electronic luggage tag 100, A connecting means 70 such as a strap penetrates the open 14 on the top cover 10 and the opening 94 of the card plastic cover 90 of the tag to further connect the luggage tag 100 to the luggage 200. In operation, after being transported in the luggage compartment of an airplane, the luggage 200 is transported to the retrieval carousel in the airport terminal. The luggage 200 is caused to slide down a chute onto the conveyor belt or carousel. This jostling causes the motion detector 39 to be activated which in turn activates the electronic circuit so that the circuit goes from standby mode to activation mode and thereby activates the LEDs which are caused to blink on and off, either in unison or sequentially, for a period of time such as 10 seconds to 1 minute, so that the blinking lights alter the owner to the location of the luggage. While four LEDs are the preferred embodiment, it will be appreciated that it is within the spirit and scope of the present invention to have at least one illumination source such as an LED. In addition, while a series of three DC batteries is the preferred power source, any other source of power such as at least one DC battery is within the spirit and scope of the present invention.

Defined in detail, the present invention is a luggage tag, comprising: (a) a top cover having an outer top surface with a proximal round end which extends to a rectangular body terminating in a distal end, a transverse opening located close to the proximal round end, the top cover further having a first elongated sidewall, a second elongated sidewall, and a distal sidewall extending transversely to the elongated sidewalls, the first and second elongated sidewalls each having two spaced apart openings, with one opening nearer the proximal round end and the other opening nearer the distal sidewall, the top cover having an inner side which includes a base of a battery compartment to retain at least one battery and connector means to contact the at least one battery; (b) a rear information card frame having a generally rectangular shape having a proximal strip bar as its proximal end, a distal curved bar as its distal end to match a flat bottom end of the top cover, a first and second side flat elongated area which match the respective vertical first sidewall and second sidewall of the top cover, wherein the proximal strip bar, the distal flat end bar, the first and second side flat area form a frame containing a rectangular opening as a window for displaying an information card, the rear of the information card frame further comprises a battery compartment with a cover which is located adjacent to the distal flat end bar, the rear information frame further including an additional strip bar transverse to the first and second side flat area, and further being between the battery compartment cover and the rectangular opening; (c) an electronic circuit board containing a plurality of LED lights with a respective LED inserted through a respective opening in a sidewall of the top cover, an integrated electronic circuit, and a motion detector, and means to electronically connect the circuit board to the at least one battery; (d) a transparent plastic sheet having a proximal round front end which extends to a rectangular body with a flat end transverse to the round front end, the plastic sheet has a round opening located close to the proximal round end; (e) the electronic components of the luggage tag are powered by the at least one battery but are at a standby state which only consumes a finite standby current, the electronics being activated by a physical motion of the tag wherein the physical motion is detected by the motion detector which exports electrical signals to trigger the integrated electronic circuit to output a sequential power to the LEDs for emitting a blinking light from each LED for a period of time, before the electronics turns back to the standby state; and (f) means by which the luggage tag is connected to a portion of a piece of luggage, the connecting means extending through the transverse opening in the top cover and the plastic sheet.

Defined more broadly, the present invention is a luggage tag, comprising: (a) a top cover having an outer top surface with a proximal end which extends to a body terminating in a distal end, a transverse opening located in the outer top surface, the body of the top cover having a multiplicity of openings, the body of the top cover having a housing for retaining a source of power and means to connect the source of power; (b) the top cover having an underside which includes retaining means for retaining an information card and protecting means to protect the information card; (c) an electronic circuit board containing a multiplicity of LED lights with a respective LED inserted through a respective opening in the body of the top cover, an integrated electronic circuit, and a motion detector, and means to electronically connect the circuit board to the source of power; and (d) the electronic components of the luggage tag are powered by the source of power but are at a standby state which only consumes a finite standby current, the electronics being activated by a physical motion of the tag wherein the physical motion is detected by the motion detector which exports electrical signals to trigger the integrated electronic circuit to output a sequential power to the LEDs for emitting a blinking light from each LED for a period of time, before the electronics turns back to the standby state.

Defined even more broadly, the present invention is a luggage tag, comprising: (a) a top cover having an outer top surface with a proximal end which extends to a body terminating in a distal end, the body of the top cover having a multiplicity of openings; (b) the luggage tag having a housing for retaining a source of power and means to connect the source of power; (c) an electronic circuit board containing a multiplicity of LED lights with a respective LED inserted through a respective opening in the body of the top cover, an integrated electronic circuit, and a motion detector, and means to electronically connect the circuit board to the source of power; and (d) the electronic components of the luggage tag are powered by the source of power but are at a standby state which only consumes a finite standby current, the electronics being activated by a physical motion of the tag wherein the physical motion is detected by the motion detector which exports electrical signals to trigger the integrated electronic circuit to output a sequential power to the LEDs for emitting a blinking light from each LED for a period of time, before the electronics turns back to the standby state.

Defined most broadly, the present invention is a luggage tag, comprising: (a) a top cover having an outer top surface with a proximal end which extends to a body terminating in a distal end, the body of the top cover having at least one opening; (b) the luggage tag having a housing for retaining a source of power and means to connect the source of power; (c) an electronic circuit board containing at least one source of illumination which extends through the at least one opening in the body of the top cover, an integrated electronic circuit, and a motion detector, and means to electronically connect the circuit board to the source of power; and (d) the electronic components of the luggage tag are powered by the source of power but are at a standby state which only consumes a finite standby current, the electronics being activated by a physical motion of the tag wherein the physical motion is detected by the motion detector which exports electrical signals to trigger the integrated electronic circuit to output power to the at least one source of illumination for a period of time, before the electronics turns back to the standby state.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A luggage tag, comprising:

a. a top cover having an outer top surface with a proximal round end which extends to a rectangular body terminating in a distal end, a transverse opening located close to the proximal round end, said top cover further having a first elongated sidewall, a second elongated sidewall, and a distal sidewall extending transversely to the elongated sidewalls, said first and second elongated sidewalls each having two spaced apart openings, with one opening nearer the proximal round end and the other opening nearer the distal sidewall, the top cover having an inner side which includes a base of a battery compartment to retain at least one battery and connector means to contact the at least one battery;

b. a rear information card frame having a generally rectangular shape having a proximal strip bar as its proximal end, a distal curved bar as its distal end to match a flat bottom end of the top cover, a first and second side flat elongated area which match the respective vertical first sidewall and second sidewall of the top cover, wherein the proximal strip bar, the distal flat end bar, the first and second side flat area form a frame containing a rectangular opening as a window for displaying an information card, the rear of the information card frame further comprises a battery compartment with a cover which is located adjacent to the distal flat end bar, said rear information frame further including an additional strip bar transverse to the first and second side flat area, and further being between the battery compartment cover and the rectangular opening;

c. an electronic circuit board containing a plurality of LED lights with a respective LED inserted through a respective opening in a sidewall of the top cover, an integrated electronic circuit, and a motion detector, and means to electronically connect the circuit board to the at least one battery;

d. a transparent plastic sheet having a proximal round front end which extends to a rectangular body with a flat end transverse to the round front end, the plastic sheet has a round opening located close to the proximal round end;

e. means by which the luggage tag is connected to a portion of a piece of luggage, the connecting means extending through the transverse opening in the top cover and the plastic sheet; and f. the electronic components of the luggage tag are powered by the at least one battery but are at a standby state which only consumes a finite standby current, the electronics being activated by a physical motion of the tag wherein the physical motion is detected by the motion detector which exports electrical signals to trigger the integrated electronic circuit to output a sequential power to the LEDs for emitting a blinking light from each LED for a period of time, in order to provide a visual indication of the location of the luggage tag and the luggage to which it is attached, before said electronics turns back to the standby state state.

2. The electronic luggage tag in accordance with claim 1, wherein said top cover is made of a plastic.

3. The electronic luggage tag in accordance with claim 1, wherein said rear information card frame is made of a plastic.

4. A luggage tag, comprising:

a. a top cover having an outer top surface with a proximal end which extends to a body terminating in a distal end, a transverse opening located in the outer top surface, the body of the top cover having a multiplicity of openings, the body of the top cover having a housing for retaining a source of power and means to connect the source of power;

b. the top cover having an underside which includes retaining means for retaining an information card and protecting means to protect the information card;

c. an electronic circuit board containing a multiplicity of LED lights with a respective LED inserted through a respective opening in the body of the top cover, an integrated electronic circuit, and a motion detector, and means to electronically connect the circuit board to the source of power;

d. means by which the luggage tag is connected to a piece of luggage; and e. the electronic components of the luggage tag are powered by the source of power but are at a standby state which only consumes a finite standby current, the electronics being activated by a physical motion of the tag wherein the physical motion is detected by the motion detector which exports electrical signals to trigger the integrated electronic circuit to output a sequential power to the LEDs for emitting a blinking light from each LED for a period of time, in order to provide a visual indication of the location of the luggage tag and the luggage to which it is attached before said electronics turns back to the standby state.

5. The luggage tag in accordance with claim 4 wherein said source of power is a series of three DC batteries.

6. The luggage tag in accordance with claim 4 wherein said source of power is at least one DC battery.

7. The luggage tag in accordance with claim 4 further comprising means by which the luggage tag is connected to a portion of a piece of luggage, the connecting means extending through the transverse opening in the top cover.

8. A luggage tag, comprising:

a. a top cover having an outer top surface with a proximal end which extends to a body terminating in a distal end, the body of the top cover having a multiplicity of openings;

b. the luggage tag having a housing for retaining a source of power and means to connect the source of power;

c. an electronic circuit board containing a multiplicity of LED lights with a respective LED inserted through a respective opening in the body of the top cover, an integrated electronic circuit, and a motion detector, and means to electronically connect the circuit board to the source of power;

d. means by which the luggage tag is connected to a piece of luggage; and e. the electronic components of the luggage tag are powered by the source of power but are at a standby state which only consumes a finite standby current, the electronics being activated by a physical motion of the tag wherein the physical motion is detected by the motion detector which exports electrical signals to trigger the integrated electronic circuit to output a sequential power to the LEDs for emitting a blinking light from each LED for a period of time, in order to provide a visual indication of the location of the luggage tag and the luggage to which it is attached before said electronics turns back to the standby state.

9. The luggage tag in accordance with claim 8 wherein said source of power is a series of three DC batteries.

10. The luggage tag in accordance with claim 8 wherein said source of power is at least one DC battery.

11. The luggage tag in accordance with claim 8 further comprising means by which the luggage tag is connected to a portion of a piece of luggage, the connecting means extending through a transverse opening in the top cover.

12. The luggage tag in accordance with claim 8 further comprising means for retaining an information card and protecting means to protect the information card.

* * * * *